June 28, 1938.   J. E. HOOPER ET AL   2,122,372
BOAT FENDER
Filed June 8, 1937
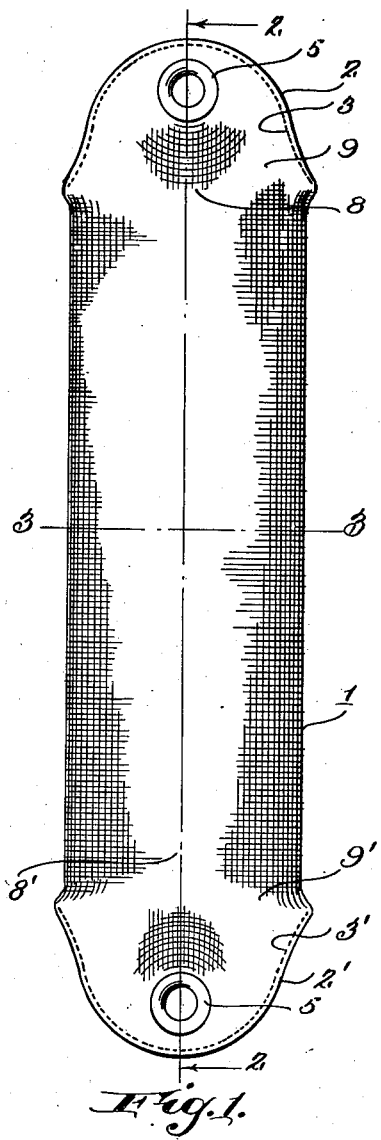
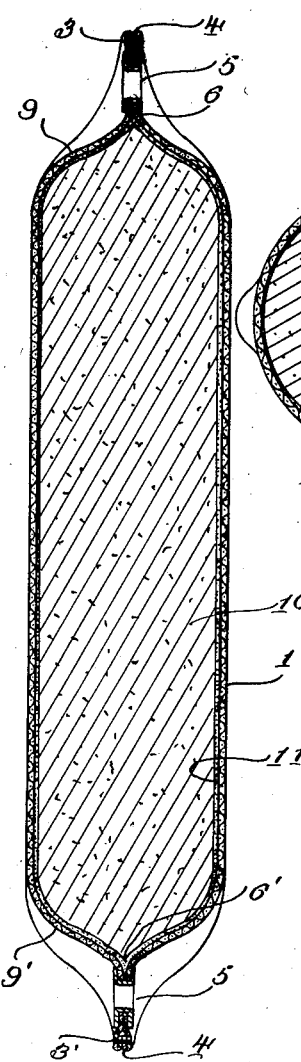
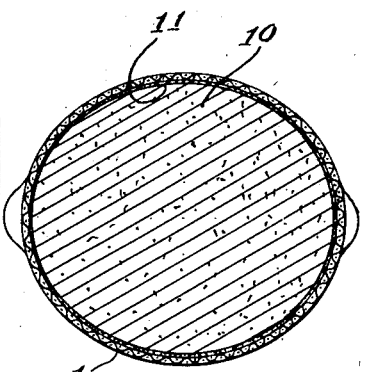
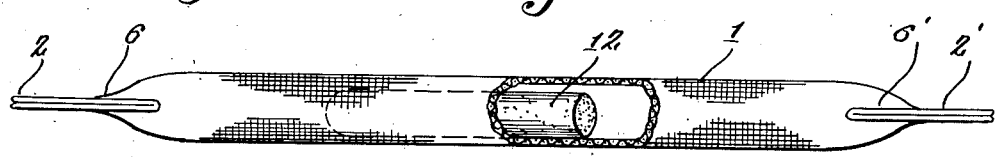

Patented June 28, 1938

2,122,372

UNITED STATES PATENT OFFICE 2,122,372

BOAT FENDER

James Edward Hooper, Ruxton, Md., and Henry T. Atno, Cedar Knolls, N. J.; said Hooper assignor to Wm. E. Hooper & Sons Company, a corporation of Maryland Application June 8, 1937, Serial No. 147,100

4 Claims. (Cl. 114—219)

The invention relates to a boat fender or bumper which has the important advantages that it is of extremely long and practically permanent life; that it is also impermeable by water and permanently buoyant and, at the same time, sufficiently heavy to avoid displacement by wind and the like from the effective vertical position which it assumes when hung over the side of the boat to which it is applied.

Features of the fender of the invention are that it is provided with a tubular covering of cotton duck or similar fabric which may be seamless except as to the extreme end portion and therefore not subject to rupture at the pressures to which it is subjected in bumping; and it is of further importance that the filler, instead of being, in accordance with the regular practice, in the form of small particles which would transmit the pressure due to the shocks of bumping to the fabric after the manner of a liquid, is in a single piece of highly resilient material which, though it is closely confined within the fabric so that it transmits a certain pressure to the fabric when it receives the bumping shocks, also presents to such shocks an independent resistance due to the compression of the rubber. The cover serves the purpose of a container within which the filler is inflated, compressing the rubber at the surface of the filler at the time of vulcanization to form a water-impervious skin, and it also serves as a protection for the filler block and as an attaching means for the eyes whereby the bumper is supported. To serve this purpose in a satisfactory manner, a fabric having crossed or intermeshing strands is desirable, if not essential, to hold the rubber in confinement during inflation. Cotton duck is a good example of such fabric. Other types having differently combined strands may be employed to equal advantage. In the manufactured product, a tubular wicking has been used for this purpose, as hereinafter described.

In the preferred form, the bumper of the invention consists of a tubular fabric cover preferably formed of a tubular woven fabric within which the filler, which is sponge rubber, is inflated; the cover serving to limit the degree of inflation of the rubber and also serving to mold it to the shape of the casing and prevent disintegration. The tubular cover has the further advantage that it is seamless as to the portion subjected to the pressure of bumping.

In the practice of the invention, a relatively small piece of rubber compound, containing vulcanizing agent and having mixed therein an agent capable of generating a neutral gas when heated as in vulcanization, is enclosed in the tubular casing, the ends of the tube being closed. The casing and the rubber compound therein are then heated to the temperatures and for the periods known to the rubber art. This causes the generation of gases within the rubber compound whereby it is inflated to fit closely within the casing, and vulcanized in its inflated dimension and condition. Before inflation, the ends of the tube are flattened and sewed and suitable grommets or eyes are inserted in the flattened portion and fastened in position, serving as a means for attachment of the lines by which the fender is hung over the side of the boat in bumping position. The gas-generating compounds used are known to the manufacturer of sponge rubber. The steps mentioned are subject to variation.

In the accompanying drawing, we have illustrated a boat fender or bumper embodying the features of the invention in the preferred form.

In the drawing:

Figure 1 is an elevation of the bumper.

Figure 2 is a section on the line 2—2 in Figure 1.

Figure 3 is a section at right angles to both figures, being taken on the lines 3—3 in Figure 1.

Figure 4 is a view of the casing before inflation, showing the rubber compound therein provided for this purpose.

Referring to the drawing by numerals, each of which is used to indicate the same or similar parts in the different figures, the construction shown in Figures 1, 2, and 3 comprises a tubular bag or casing 1 which is preferably formed of tubular woven fabric which is to best advantage woven in the form of an integral, seamless tube. This tubular material is cut to a suitable length and each length which is to form the cover of a finished fender is preferably cut to a curved outline at 2—2' as shown at the top and bottom ends in Figure 1, and stitched at 3—3', at the respective ends, the edges being preferably turned inwardly as shown at 4 in Figure 2, and suitable grommets or rings 5 are inserted and fastened in the end portions which are preferably flattened at the ends as best illustrated at 6—6 in Figure 2, or other suspension means may be provided.

Before closing the casing in each instance, a small piece 12 of vulcanizable rubber compound consisting of raw rubber and a vulcanizing agent or agents, and a material such as a carbonate which when heated to vulcanizing temperature releases a gas which does not injure the rubber, is inserted in the bag or casing and when the casing is closed the rubber compound is inflated and vulcanized by placing the casing with the vulcanizable rubber compound in a suitably heated enclosure. A satisfactory result can be obtained by including in the rubber compound any volatile agent or other material which, either by heating or other treatment, gives off a gas which is confined within the rubber compound and serves as an inflating agent. Such agents for inflating rubber to form what is known as sponge rubber, which is the product that actually fills the finished fender, are well known in the rubber art—also the proportions necessary to give any desired degree of inflation, which in this instance should be sufficient to fill the casing, applying a degree of tension to the fabric which is not harmful.

The inflating step by which the rubber compound is turned to sponge rubber and vulcanized expands the rubber to fit closely within the casing, the casing being, in effect, distended under considerable tension; and the rubber filler or sponge rubber which fills the casing and serves to distend it in this way therefore fits closely within the case and fills all portions of the casing which are accessible to the rubber as it expands.

It will be noted as to the fender or bumper in its completed form that the central zone 8—8', which in the form shown is of circular cross section, extends from the shoulders 9 near the top in Figures 1 and 2 to the shoulders 9' near the bottom in the same figures, the circular cross section Figure 3 representing the preferred cross section of this central zone which is adapted to receive, and normally does receive, the shocks or bumps which are applied to the fender, which thus protects the side of the boat.

The fender thus provided is seamless as to this central zone 8—8' which receives the shocks and bumps and is therefore not subject to splitting or ripping, and it is filled with a single piece of sponge rubber 10 which in itself is resilient and adapted to receive and take up the shocks independently of the tension of the fabric tube 1. While the filler is preferably in a single piece, the separation of the filler into several pieces, if found desirable for any reason, is contemplated.

The fender thus formed and filled with inflated sponge rubber 10, while it is sufficiently heavy to hang vertical or plumb and maintain its bumping position, is also buoyant in liquids of the weight of water, and such bumpers are adapted to serve in a satisfactory manner as cushions or life preservers, being highly resilient or elastic and permanently buoyant, the rubber block 10 having an impermeable coating 11 as to its entire external surface. For the purpose of a marine cushion or life preserver, the casing may have any desired shape.

We have thus described specifically and in detail a boat fender embodying the features of our invention in the preferred form. While the description is specific and includes the detailed construction, the specific terms contained herein are used in a descriptive rather than in a limiting sense, the scope of the invention being defined in the claims.

What we claim as new and desire to secure by Letters Patent is:

1. A boat fender comprising an outside casing consisting of a single-piece seamless fabric tube of intermeshing strands, the tube being closed at the ends and a filler of resilient sponge rubber within the tube, which tube fits tightly about the filler, being maintained under tension thereby, the filler having a surface skin of substantially the same composition as the sponge rubber, covering approximately its entire surface and vulcanized to the tube substantially throughout the area of its walls, an end of the tube being flattened and having rope fastening means secured in and to both walls of the tube at said flattened portion.

2. A boat fender consisting of an outside casing in the form of a cylindrical tube of textile fabric of intermeshing strands and a body of sponge rubber of the same size and shape as the casing tightly enclosed thereby, and having a thin skin of the same composition as the sponge rubber formed on and substantially covering said body within the casing, which is closed at the ends, one of said closed ends being flattened and having rope fastening means secured in and to both walls of the casing at said flattened portion.

3. A boat fender comprising an outside casing consisting of a single piece seamless fabric tube of intermeshing strands, the tube being closed at the ends, a filler of resilient sponge rubber within the casing, which fits tightly about the filler, being maintained under tension thereby, the filler having a surface skin of substantially the same composition as the sponge rubber, covering its entire surface and vulcanized to the casing substantially throughout the area of its walls, an end of the casing having rope-fastening means secured solely to the wall of the casing at said end.

4. A boat fender consisting of an outside casing, in the form of a cylindrical tube of textile fabric, composed of intermeshing strands, and a body of sponge rubber of the same size and shape as the casing, tightly enclosed thereby, and having a thin skin of substantially the same composition as the sponge rubber formed on and substantially covering said body within the casing, which is closed at both ends, one of said ends having rope-fastening means secured to the wall of the casing at said end, and terminating substantially adjacent said end.

JAMES EDWARD HOOPER.
HENRY T. ATNO.